United States Patent [19]

Murakami

[11] Patent Number: 5,775,627
[45] Date of Patent: *Jul. 7, 1998

[54] FILM WINDER

[75] Inventor: Motoaki Murakami, Wakayama, Japan

[73] Assignee: Noritsu Koki Co., Ltd., Wakayama, Japan

[*] Notice: The term of this patent shall not extend beyond the expiration date of Pat. No. 5,632,454.

[21] Appl. No.: 832,682

[22] Filed: Apr. 9, 1997

Related U.S. Application Data

[63] Continuation of Ser. No. 492,565, Jun. 20, 1995, abandoned.

[30] Foreign Application Priority Data

Jun. 20, 1994 [JP] Japan ................................ 6-137247

[51] Int. Cl.⁶ ...................... B65H 35/08; B65H 39/14; B65H 19/28
[52] U.S. Cl. ............... 242/526; 242/528; 242/534; 242/532.5; 242/548
[58] Field of Search ................ 242/520, 526, 242/528, 548, 534, 532.7, 532.5; 355/28, 29

[56] References Cited

U.S. PATENT DOCUMENTS

| | | | |
|---|---|---|---|
| 3,715,087 | 2/1973 | Schmidt | 242/534 X |
| 4,463,586 | 8/1984 | Griffin | 242/534 X |
| 4,509,703 | 4/1985 | Grunder | 242/528 |
| 4,544,110 | 10/1985 | Nagel et al. | 242/534 X |
| 5,040,018 | 8/1991 | Kawada et al. | 355/29 X |
| 5,060,880 | 10/1991 | Mayer | 355/28 X |
| 5,544,840 | 8/1996 | Murakami | 242/532.7 |
| 5,632,454 | 5/1997 | Murakami | 242/530.2 |

FOREIGN PATENT DOCUMENTS 0 611 993  8/1994  European Pat. Off. .

OTHER PUBLICATIONS

U.S. patent application Ser. No. 08/412,740, filed Mar. 29, 1995, entitled "Continuous Film Take-Up Apparatus", by Motoaki Murakami.

U.S. patent application Ser. No. 08/339,251, filed Nov. 10, 1994, entitled "Continuous Film Take-Up Apparatus", by Motoaki Murakami, now U.S. Pat. No. 5,544,840.

*Primary Examiner*—John Q. Nguyen
*Attorney, Agent, or Firm*—Wenderoth, Lind & Ponack, L.L.P.

[57] ABSTRACT

A film winder takes up developed films continuously into a film magazine. The developed films attached to a leader are guided by a leader feed adjusting unit. After being cut from the leader by a film cutter, the films are fed to a film guide by a press roller of a separator. The films are turned by a turn guide and a turn roller and are fed to a take-up member. The films are wound in the film magazine one by one.

6 Claims, 18 Drawing Sheets

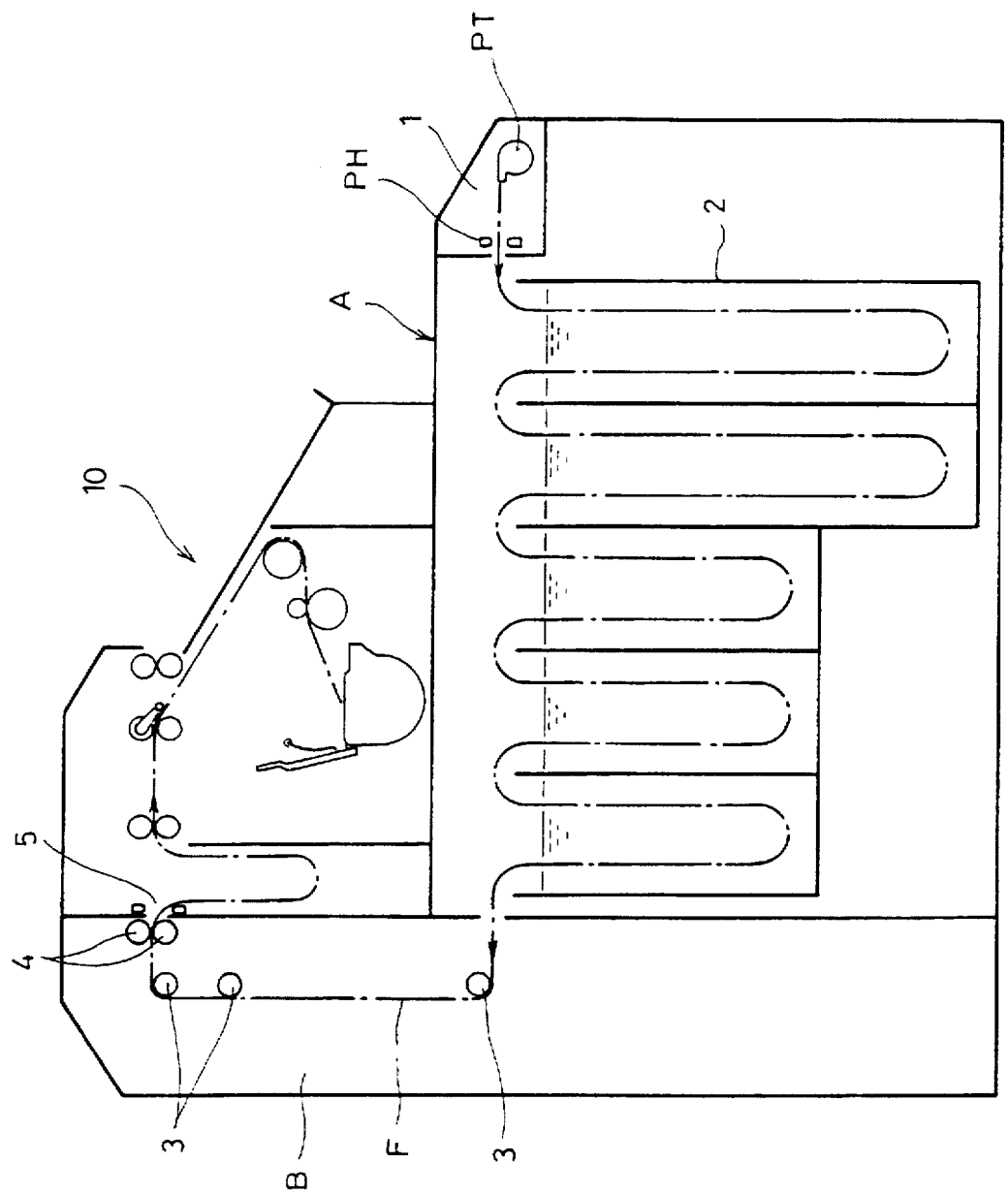

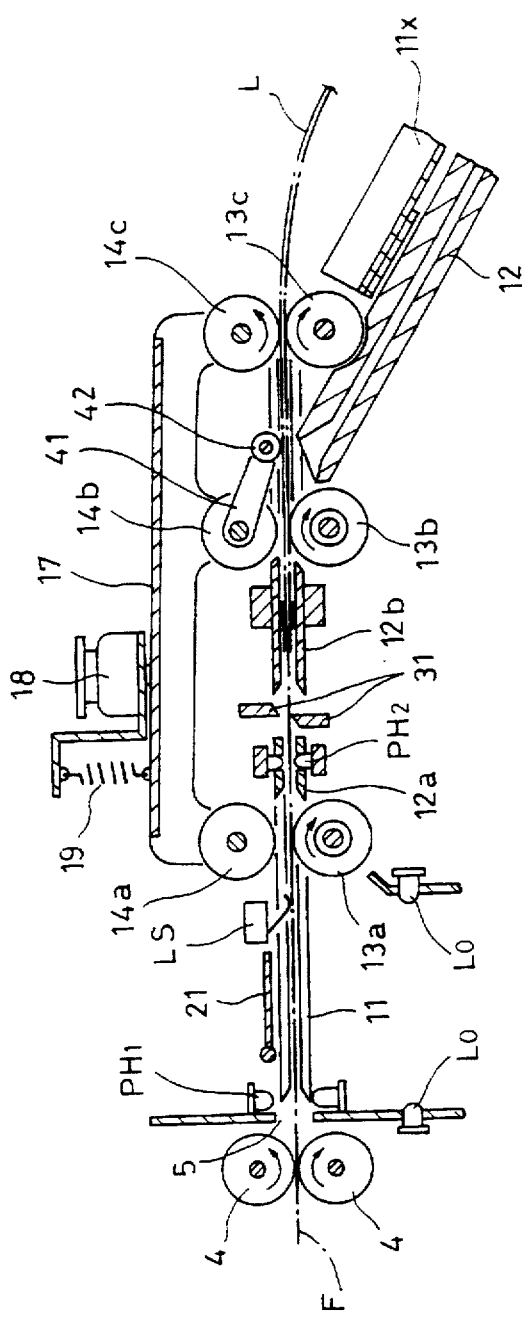
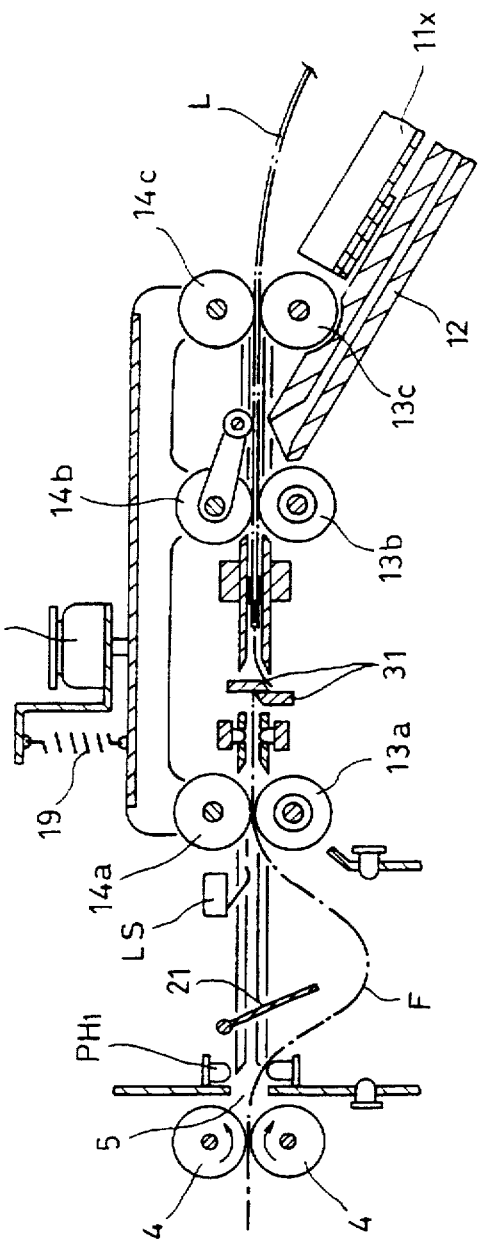
FIG. 10A
FIG. 10B

FILM WINDER

This application is a continuation of now abandoned application, Ser. No. 08/492,565, filed Jun. 20, 1995.

BACKGROUND OF THE INVENTION

This invention relates to a film winder for winding films developed in a developing machine into a film magazine.

In order to develop films, a leader is attached to the leading end of each film pulled out of a patrone (a container for an unexposed film) with a splicing tape. Then, pulled by the leader, the film is passed through developing tanks and a drying unit in the developing, machine. The thus developed and dried film is discharged from the developing machine.

The film discharged from the developing machine has to be manually cut apart from the leader with scissors, hand-carried to a film printer, and inserted into its negative mask. Otherwise, a plurality of cut-apart films may be spliced together with a film splicer, wound into a roll, and fed into a film printer. These and other related operations have to be carried out by hand.

Namely, the film processing operations after the films are discharged until they are fed into the film printer have to be carried out almost entirely by hand. Such operations include, for example cutting leaders from films, hanging them on film hangers before hand-carrying them to the film printer, splicing a plurality of films together, etc. Such operations is not only are troublesome and time-consuming but are highly inefficient.

An object of this invention is to provide a film winder which can fully automatically wind developed films into a film magazine with high efficiency.

Another object of the invention is to provide a film winder which can continuously wind a plurality of films into a film magazine without the need of splicing them together.

SUMMARY OF THE INVENTION

According to this invention, there is provided a film winder for winding films discharged from a film developing machine. The film winder includes a film feed path including a number of units through which developed films discharged from the film developing machine are fed with leaders attached to their leading ends. A film feed adjusting means provided along the film feed path adjust the feed rate of films by slackening the films. A film cutter cuts the films from the leaders. A separator directs directs the films and leaders into separate paths. The films then are wound onto a film magazine.

In one arrangement, the film feed path comprises a predetermined number of lanes, the predetermined number being equal to the number of the film or films attached to each leader, each unit being provided in the predetermined number, and a means for continuously winding films is provided upstream of the film magazine.

In another arrangement, the film feed path comprises a predetermined number of lanes, the predetermined number being equal to the number of the film or films attached to each leader, each unit other than the film magazine being provided in the predetermined number, and a movable magazine unit having a means for continuously winding films is provided upstream of the film magazine, whereby a plurality of films can be continuously reeled into the magazine unit.

In either of the arrangements, the winder preferably comprises a means for picking out, from among the films being fed through the film feed path, films that cannot be reeled in because their widths are not right, and means for stocking the thus picked-out films.

A film discharged from the film developing machine with a leader attached thereto is fed into the film feed path. When it is fed to a position where its portion immediately behind the joint portion between the film and the leader comes into the film cutting unit, the feed of the film is stopped, and the film is cut from the leader. Even while the film is held up at the cutting unit, the following film is being fed into the winder. But the film feed adjusting unit prevents this film from interfering with the former film by adjusting the feed rate of the following film.

After cutting the film from the leader, the films pass through the separator, where the leader, made from a flexible, slightly hard resin, is discharged from the film feed path, while the film, made of a soft material, is separated from the leader and fed obliquely downward through the film guides.

The film magazine is provided at the outlet of the film guides. When the film is wound into the film magazine, the reel of the film magazine is rotated at a speed synchronized with the feed speed of the film being fed from the film guide. Thus, it is possible to wind films continuously into the film magazine. These operations are fully automated, so that no human labor is needed.

The film take-up means are provided upstream of the film magazine. The leading end of a film is inserted under the rear end of the preceding film, so that it is possible to wind a plurality of films without splicing them together.

A plurality of film feed paths are provided so that a plurality of films connected to one leader can be processed at the same time. A plurality of films can be wound into a movable magazine unit. Thus, it is possible to wind a plurality of films without splicing them together.

The winder according to the present invention has a means for picking out films having a width other than a standard width (such as 135 mm). With this arrangement, only 135 mm films are processed in a normal manner, while the other films are stocked in the stock means.

Other features and objects of the present invention will become apparent from the following description made with reference to the accompanying drawings, in which:

BRIEF DESCRIPTION OF THE DRAWINGS

FIG. 8 is a view illustrating the entire film feed paths provided in the film developing machine and the film winder;

FIGS. 10A and 10B are sectional views illustrating the functions of feeding and separating films and leaders in the film feed path;

DETAILED DESCRIPTION OF THE PREFERRED EMBODIMENT

Figure 1:
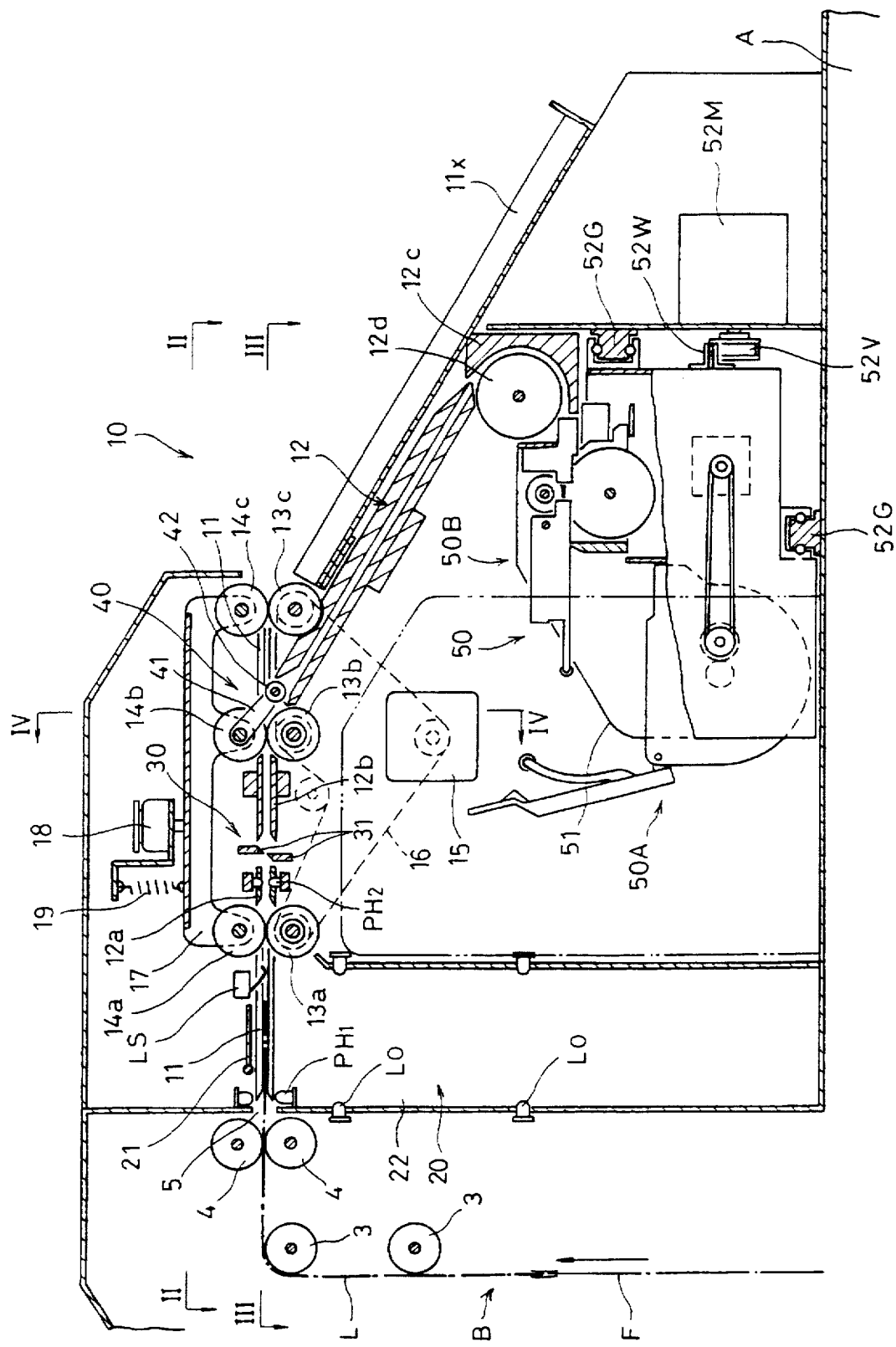
FIG. 1 is a schematic view of an entire film winder provided on top of a film developing machine.

Referring to the drawings, embodiments of this invention now will be described.

FIG. 1 shows an entire film winder 10 according to the invention. Shown mounted on a film developing machine A. This film winder comprises a film feed adjusting unit 20, a film cutter means 30 for cutting leaders from films, a separator 40 for directing films and leaders into separate paths, and a movable magazine unit 50 comprising a film magazine 50A for reeling films and a take-up means 50B provided immediately before the film magazine 50A to feed films continuously into the film magazine. These units are provided along the feed path for developed film.

In this embodiment, the film winder 10 is fixedly mounted on top of the film developing machine A, but it may be detachably mounted on the developing machine A.

Figure 2:
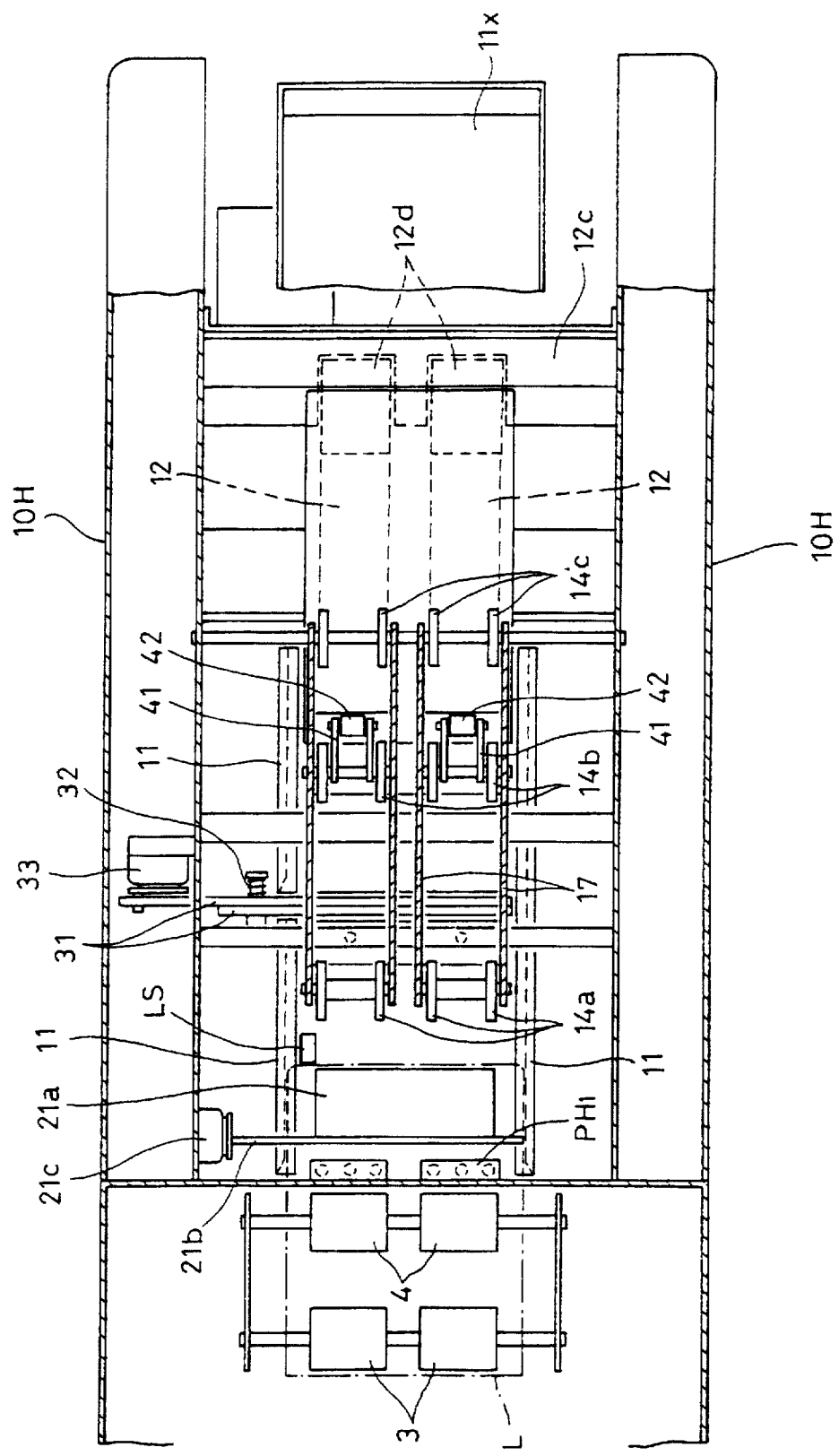
FIG. 2 is a plan view taken along line II—II of FIG. 1.

As shown in FIG. 2, the film feed path has horizontal leader feed guides 11, and film guides 12 for guiding films separated from leaders by the separator 40 provided along the guides 11. Film guide plates 12a and 12b are provided between the leader feed guides 11 to restrain up-and-down movements of films.

Leaders and films are fed along the film feed path by a plurality of sets of feed rollers 13 and pressure rollers 14 arranged at predetermined intervals. The feed rollers 13 are fixed in position and driven by a motor 15 through a belt 16. In this embodiment, three sets of pressure rollers (14a–14c) are used. They are coupled together through arms 17 which are pivotable about the front pressure rollers 14c by solenoids 18. Normally, the arms 17 are kept in a raised position by tension springs 19. By activating the solenoids 18, the arms 17 are pushed down.

The film feed adjusting unit 20 is provided near the upstream end of the film feed path. It comprises a loop guide 21 and a loop tank 22. The loop guide 21 comprises a rotary shaft 21b and a guide plate 21a fixed to the rotary shaft 21b. The rotary shaft has its one end connected to a shaft-driving solenoid 21c. Sensors PH1 for detecting the type of film being fed are provided at the upstream end of the film feed path. Immediately before the pressure rollers 14a is a limit switch LS for detecting the leader being fed. On the wall of the loop tank 22 are upper and lower loop sensors Lo.

In this embodiment, the film cutter means 30 is a film cutter 31 comprising a pair of upper and lower blades. As shown in FIG. 2, the upper blade is pivotable toward the lower blade about a pin 32 with one end thereof coupled to a rotary solenoid 33. In order to cut films, the upper blade is pivoted up and down relative to the fixed lower blade by driving the solenoid 33. PH2 indicates splice sensors.

The separator 40 comprises arms 41 pivotally mounted on the support shaft of the second rows of pressure rollers 14b, and presser rollers 42 supported on front ends of the arms 41. The presser rollers 42 are pressed against films by their own weight and the weight of the arms 41, thereby separating the films from leaders.

Films separated from the leaders by the separator 40 are guided downward along the obliquely downwardly extending film guide 12. At the bottom end of the film guide 12, films are turned over by about 180 degrees by a turn guide 12c and turn rollers 12d. Then, they are fed through the take-up means 50B and reeled into the film magazine 50A.

Figure 3:
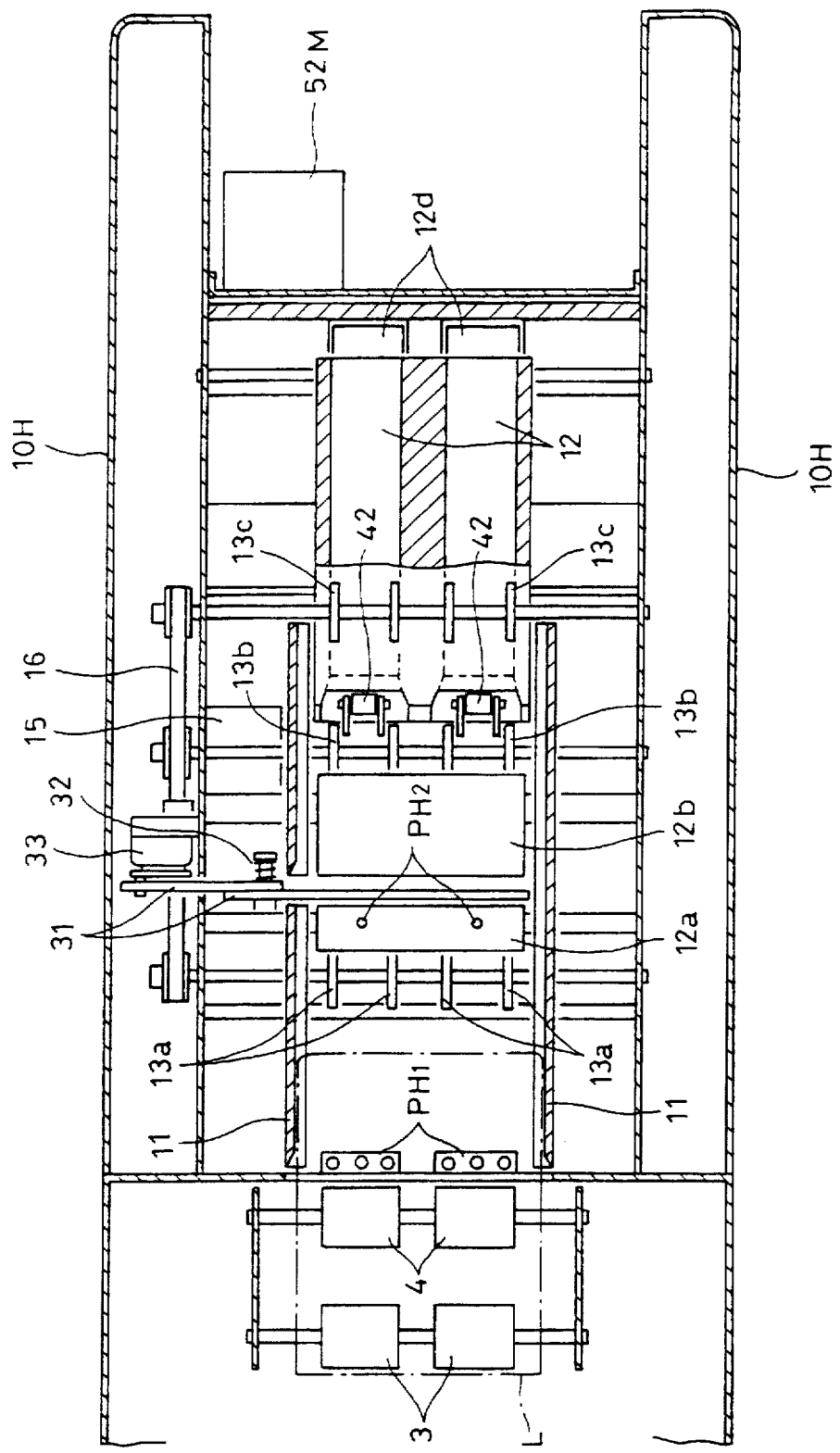
FIG. 3 is a plan view taken along line III—III of FIG. 1.

As shown in FIGS. 2 and 3, the leader feed guides 11 extend in a straight line from the inlet of the film feed path to immediately before the third sets of pressure rollers 14c and feed rollers 13c. The film guide plates 12a, 12b are disposed between the leader feed guides 11 (FIG. 3). FIG. 3 also shows a link mechanism through which the feed rollers 13a, 13b and 13c are driven by the motor 15.

As shown in FIGS. 2 and 3, in order to feed two films to be connected in parallel to a single leader, the film feed rollers 13a–13c and the pressure rollers 14a–14c are arranged in first and second pairs, the first pairs being arranged along the right film guide 12 in the right lane A and the second pairs along the left film guide 12 in the left lane B. These members are provided between two double-walled side panels 10H.

Figure 4:
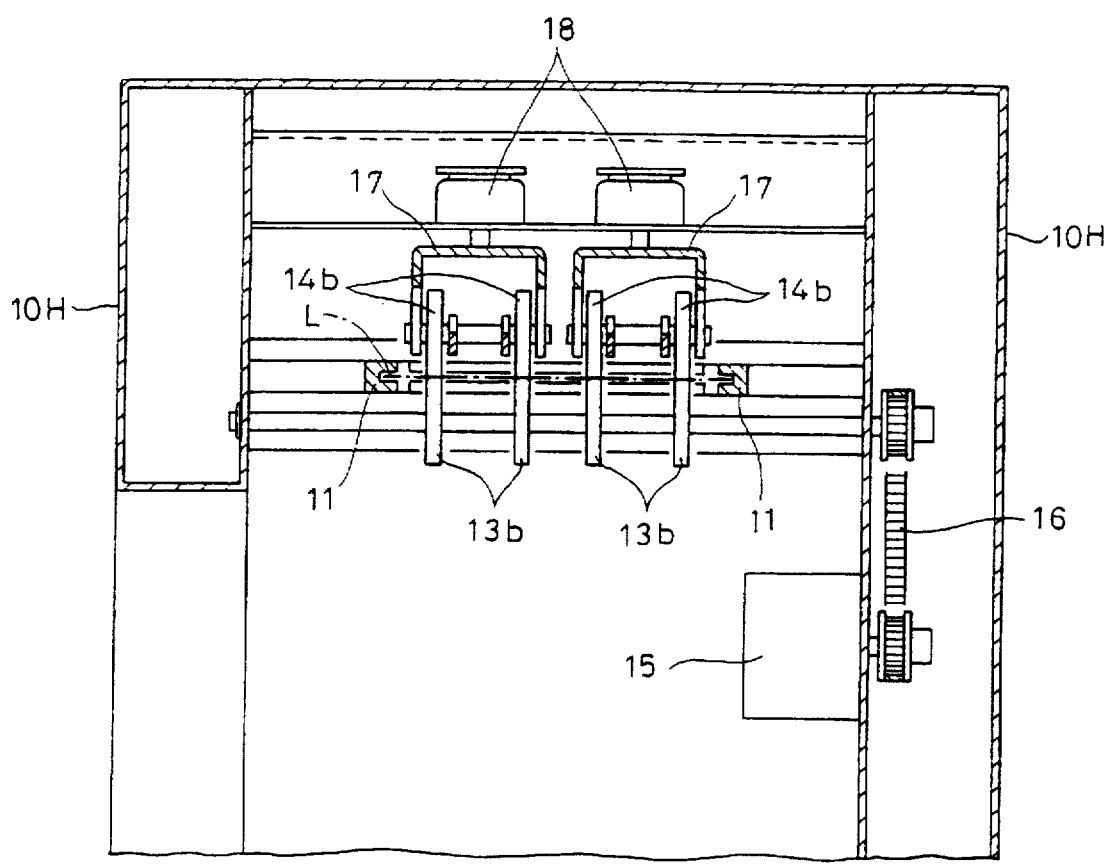
FIG. 4 is a sectional view taken along line IV—IV of FIG. 1.

FIG. 4 is a sectional view taken along line IV—IV of FIG. 1, showing a leader L being fed, guided by the leader feed guides 11 and sandwiched between the feed rollers 13b and the pressure rollers 14b.

Figure 5:
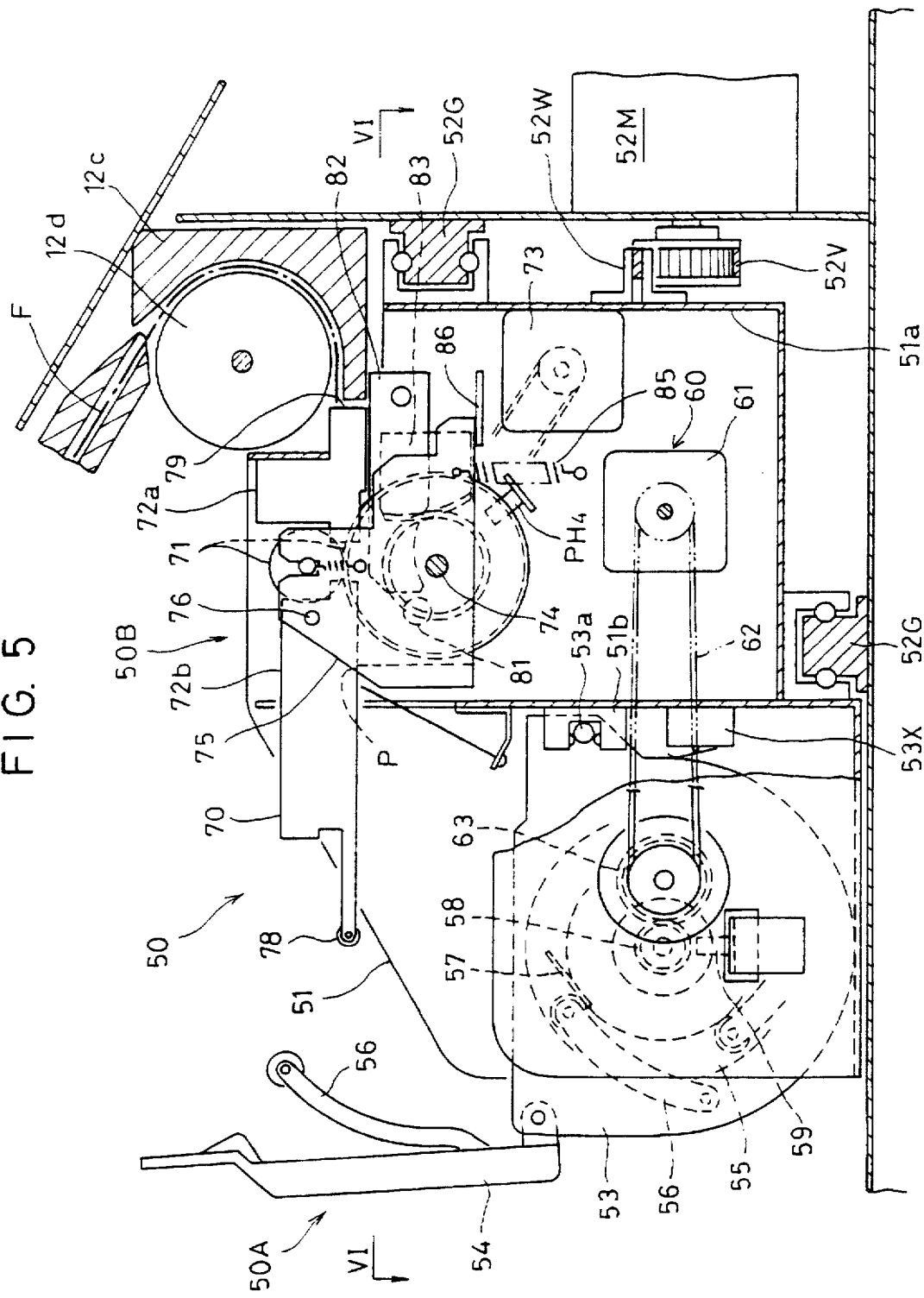
FIG. 5 is an enlarged side view around a magazine unit of FIG. 1.

FIG. 5 is an enlarged side view of the magazine unit 50 and the surrounding area. The magazine unit shown in this figure is a movable type. The film feed path has two lanes A and B to feed two films coupled to one leader simultaneously. Thus, in order to reel two films into the single magazine unit 50, this unit is movable transversely.

The magazine unit 50 is guided by upper and lower guides 52G. It is coupled to an endless belt 52V through a coupling 52W fixed to the belt 52. By driving the endless belt 52V with a unit slide motor 52M, the magazine unit 50 can be moved between the lanes A and B.

The film magazine 50A has a magazine case 53, a cover plate 54, and a magazine reel 55 for reeling films F and film pressers 56 housed in the magazine case 53. The film magazine 50A is inserted into a ⊐-shaped space defined by an inner case 51a of the take-up means 50B from the lefthand side of the figure to the position shown. Then, by engaging a pin 53a provided at the front end of the magazine case 53 with an engaging portion 51b provided on one side wall of the inner case 51 facing the ⊐-shaped space, the film magazine is detachably set in position. Numeral 57 indicates a film presser plate. 58 is a gear provided at one end of the film magazine, and 58X a magazine detecting switch.

The take-up means 50B comprises a driving unit 60 for rotating the magazine reel 55 of the film magazine 50A, and a guide/feed means 70 for feeding, while guiding, films into the film magazine 50A. The driving unit 60 has a motor 61. The magazine reel 55 is rotated by the motor 61 through a belt 62, a driving gear 63 and the gear 58 meshing with the driving gear 63 to reel films F into the film magazine.

The guide/feed means 70 comprises a pair of feed rollers 71 for feeding films F and a guide means 72 for guiding films F. The feed rollers 71 are driven by a motor 73 through a roller shaft 74., coupled to the lower feed roller 71 through a one-way clutch 74a so that the feed roller is rotated only in the direction shown by the arrow in FIG. 7.) The guide means 72 comprises an insert guide 72a and a pivot guide 72b. The latter is also driven by the motor 73.

The insert guide 72a is fixed to the side plate of the inner case 51a. The upper feed roller 71 and the pivot guide 72b are supported on a guide bracket 75 having the shape of ⊐ as a whole and having substantially trapezoidal sides and rotatably supported relative to the side plate of the inner case 51a and the roller shaft 74 extending through the side plate (see FIG. 6). The pivot guide 72b is pivotally supported on a support pin 76. While the guide bracket 75 is horizontal as shown in FIG. 5, the pivot guide 72b is also kept horizontal at the level indicated by P. As the guide bracket 75 pivots in either direction from this position, the pivot guide 72b inclines (pivots) correspondingly.

Figure 7:
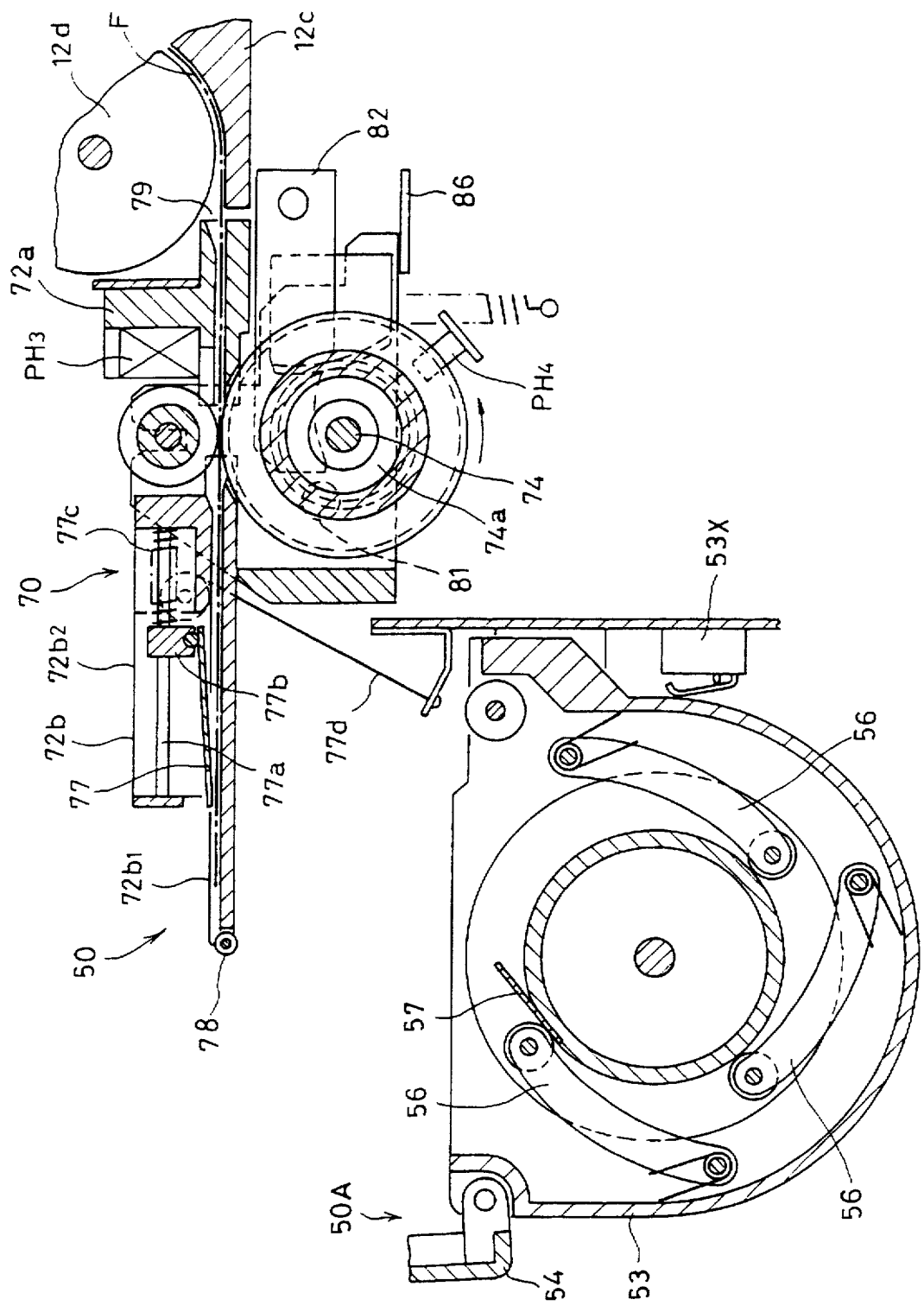
FIG. 7 is a sectional view taken along line VII—VII of FIG. 6.

The pivot guide 72b has, as shown in FIG. 7, a guide frame 72b1 for guiding films F and a guide box 72b2 placed on the guide frame. In the guide box 72b2 is a film presser 77 adapted to protrude from a front end opening of the guide box 72b2 and also capable of slight vertical movements.

The film presser 77 is pivotally pinned to a block 77b slidable along a guide rod 77a provided in the guide box 72b2. The block 77b is pulled by a rope 77d to the position shown, while compressing a spring 77c. Numeral 78 indicates a guide roller mounted on the front end of the guide frame 72b1.

When the tip (lefthand end in FIGS. 5 and 7) of the pivots guide 72b pivot downward, the rope 77d loosens, so that the film presser 77 protrudes from the guide box 72b2, urged by the spring 77c. Numeral 79 indicates an opening through which films F are inserted. The insert guide 72a carries a photoelectric sensor PH3 for detecting front and rear ends of films F.

Figure 6:
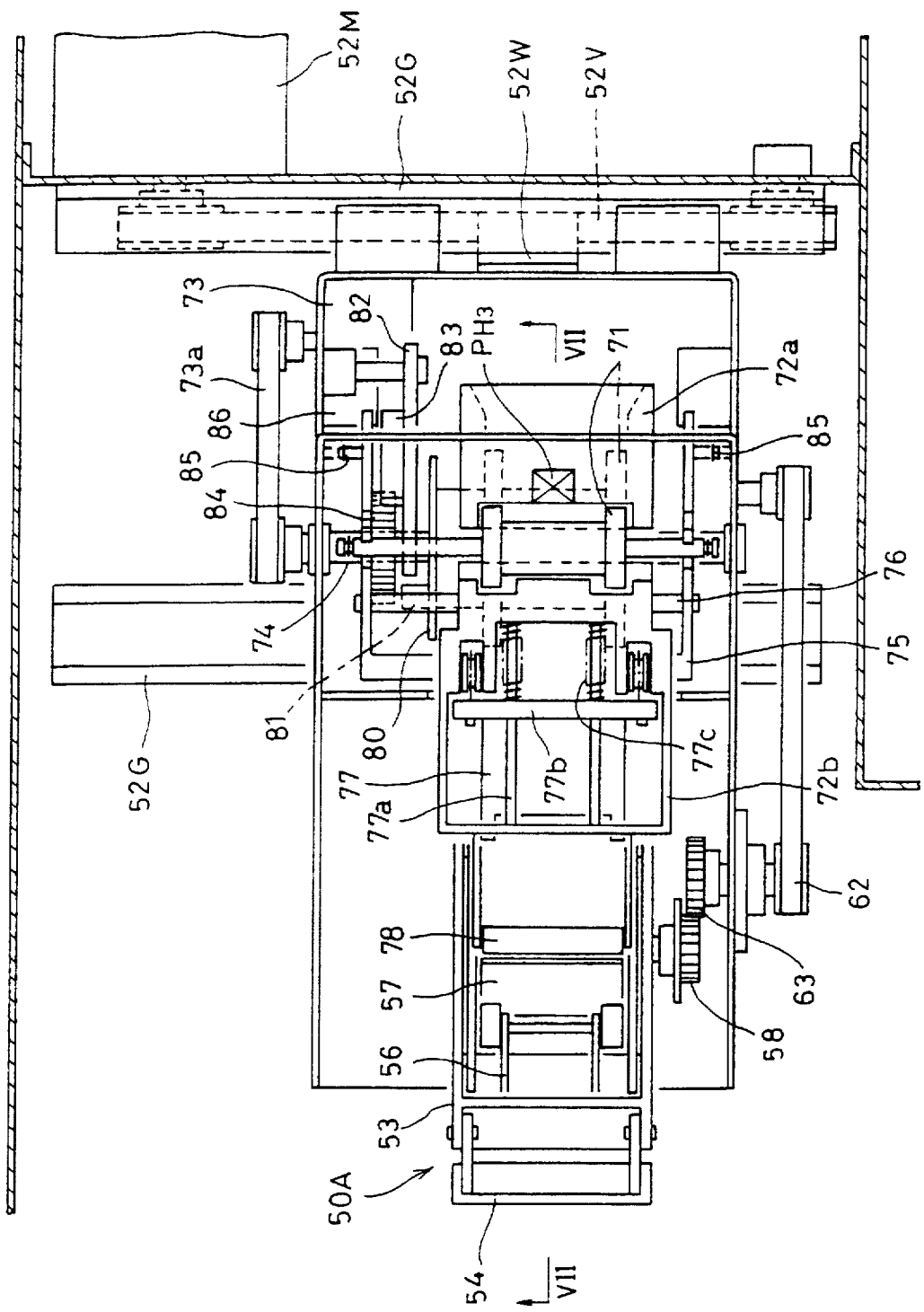
FIG. 6 is a plan view taken along line VI—VI of FIG. 5.

As shown in FIG. 6, to one side of the lower feed roller 71 is connected a detector plate 80 for detecting the rotation of the lower roller 71. It carries a roller 81 on one side thereof at a position offset from the center of rotation of the detector 80. When the detector plate 80 rotates counterclockwise together with the feed roller 71, its roller 81 abuts and raises a bent tip of an arm 82 connected to the side of the inner case 51a through a pin so as to be pivotable about the pin. Thus, the arm 82 is pivoted by the roller 81.

Beside the arm 82 is provided a fixed gear plate 83 formed with teeth on about one-eighth of its circumferential surface. Meshing with the gear plate 83 is a gear 84 fixedly mounted on one side of the guide bracket but rotatable relative to the roller shaft 74. When the arm 82 is pivoted by the roller 81, the gear 84 will rotate together with the guide bracket 75. The latter is biased by a vertically positioned return spring 85 toward its original position. In order to stop the guide bracket 75 at its original position when it turns back by the bias of the return spring 85, a stopper 86 is secured to the side plate of the inner case 51a. The detector plate 80 has a flange formed with a small hole. A photoelectric sensor PH4 is provided opposite the flange.

FIG. 8 schematically shows the entire film developing machine A equipped with the film winder 10. Numeral 1 indicates a film pullout/processing unit for connecting leaders L to films pulled out of patrones PT. Films connected to a leader are fed, led by the leader, through developing tanks at a constant speed. After being taken out of the tanks, they are dried in a drying unit B and discharged through an outlet 5 by the feed rollers 3 and 4. The thus developed films are fed into the film winder 10.

Figure 9A:
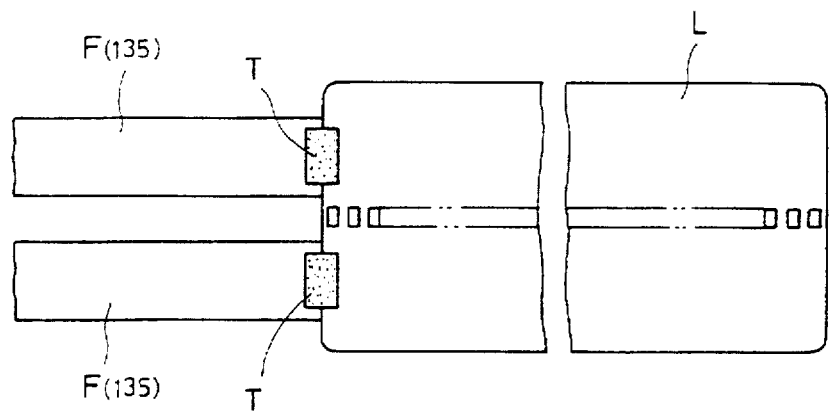
FIGS. 9A–9C are schematic views illustrating how films of different types are connected to leaders.
Figure 9B:
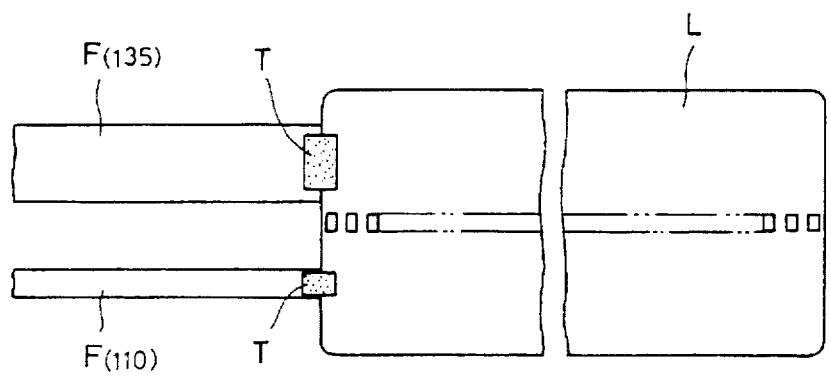
Figure 9C:
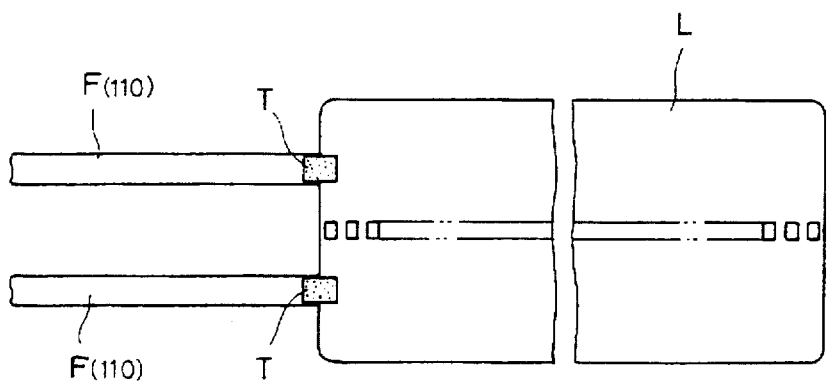

FIGS. 9A–9C illustrate various ways of connecting films F to a leader L. In this embodiment, two films F are connected, in parallel to each other, to one leader L. In the arrangement of FIG. 9A, both films are size 135. In FIG. 9B, a 135-film and a 110-film are used. In FIG. 9C, both films are size 110.

The operation of the above embodiment will not be described.

In the following description, it is assumed that both films F are size 135 as in FIG. 9A.

After leaving the drying unit B, the leader L and films F, which are connected together by splice tapes T as shown in FIG. 9A, are fed into the film winder 10. Once in the winder 10, they are brought into the pressure roller unit, guided by the leader feed guides 11. By this time, the pressure roller unit has been pivoted clockwise about the shaft of the pressure rollers 14c, so that the pressure rollers 14a, 14b are not in contact with the feed rollers. When the limit switch LS provided before the first pressure rollers 14a detects the leading end of the leader L, the motor 15 is activated to rotate the feed rollers 13a, 13b and 13c. The leader L is thus smoothly fed to the third rollers 14c. From there, the leader is fed further ahead by the third pressure rollers 14c.

The leader L has a length at least equal to the distance between the feed rollers 4 of the drying unit B and the third pressure rollers 14c so that the leader an be positively transferred from the rollers 4 to the rollers 14c (though the actual length of the leader is not shown in the figures).

When the spliced films F pass the feed rollers 13a and the splice sensors PH2 detect the splice tapes T, the leader L and films F are fed further ahead by a predetermined distance to the position shown in FIG. 10A, and stopped. Then, the solenoids 18 are activated and the pressure rollers are lowered and pressed against the films F on the lanes A and B shown in FIGS. 11.

Then, as shown in FIG. 10B, the solenoid 33 for the film cutter 31 is activated to cut the films F from the leader L. While cutting the films, subsequent films that have been developed in the developing machine A are being continuously fed into the film winder at a constant speed. Thus, these films will slacken between the feed rollers 4 and the feed rollers 13a and hang down, pushed by the loop guide 21, into the loop tank 22.

When the films F are cut apart from the leader, the motor 15 is reactivated to feed the now cut apart leader L and films F. In this state, the leader L, whose rear end is still pressed by the pressure rollers 14b, 14c, is fed horizontally, guided by the third leader feed guides 11. After passing the third pressure rollers 14c, it drops and is collected in a tray 11x.

On the other hand, the films F are fed, with their cut ends first, through the guide plates 12a and 12b. When they pass the feed rollers 13b, the film ends are pressed down by pendulum-like press rollers 42 and enter into inclined film guides 12. The films F and the leader L are guided into different paths.

By the time the front films F are guided into the film guides 12, the loops of the subsequent films A are growing to a considerable degree in the loop tank 22. When the lower one of the two loop sensors Lo detects films, the motor 15 is activated to feed the films. When the films F disappear from the detection by the upper loop sensor Lo, the motor 15 is deactivated. Since films are fed intermittently by activating and deactivating the motor, it is possible to prevent films in the drying unit B from being pulled out forcibly.

Figure 11A:
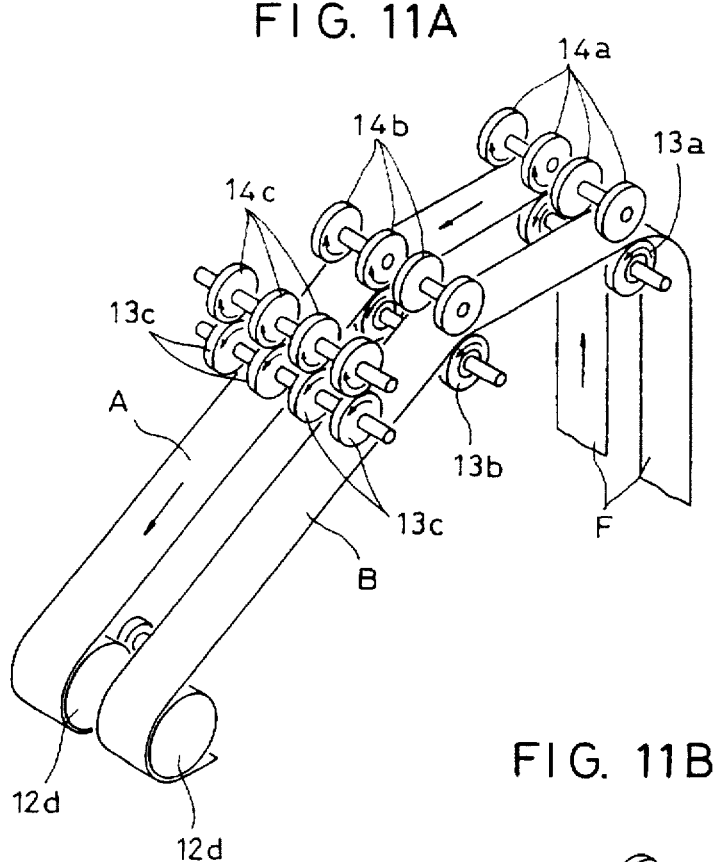
FIGS. 11A and 11B are perspective views illustrating how films are fed on two feed lanes.
Figure 11B:
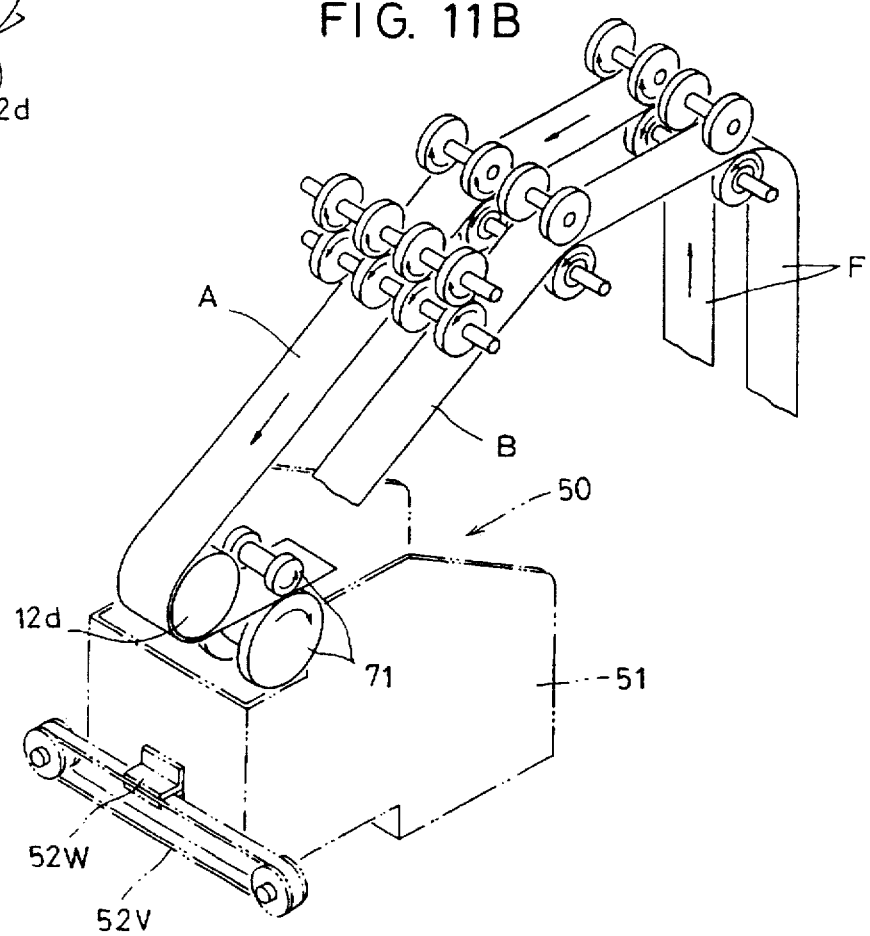

As shown in FIG. 11A, the two films separated from the leader L and guided into the film guides 12 in-parallel to each other are turned over by the turn guide 12c and the turn rollers 12d. When their leading ends reach the outlet of the turn guide 12c, the pressure rollers on the lane B are disengaged from the film to stop the feed of the film on the lane B only (the motor 15 is kept activated).

The film F on the lane A is kept fed. The magazine unit 50 is positioned beforehand facing the lane A. After the films F have been detected by a film insert sensor provided immediately before the pair of feed rollers 71 of the take-up means 50B of the magazine unit 50 (see FIG. 7), they are fed further ahead by a predetermined distance until they are caught between the feed rollers 71. Thereafter, the films are fed by the feed rollers 71. The feed rollers 13a, 13b have one-way rollers so that the films can be reeled into the take-up means 50B without resistance.

Figure 12:
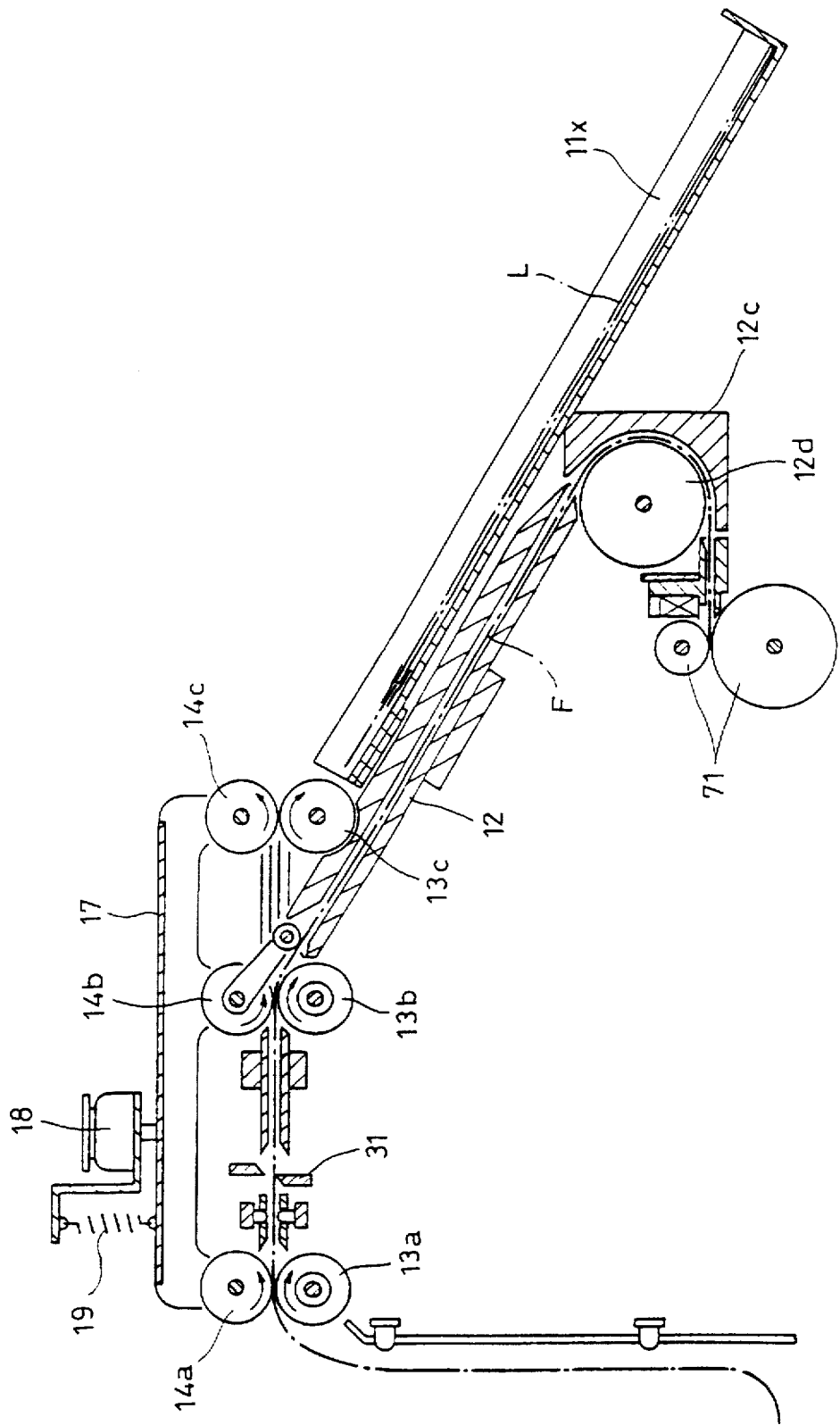
FIG. 12 is a view illustrating how films are fed after having been separated from leaders.

FIG. 12 shows the state where the film F on the lane A has passed the turn guide 12c and the turn roller 12d and has been caught between the feed rollers 71, while the leader L has been received in the tray 11x.

When the central one of the three film type detecting sensors PH1 detects the rear end of the film, the film will be fed at high speed into the film magazine 50A until it has been taken-up completely.

Figure 13:
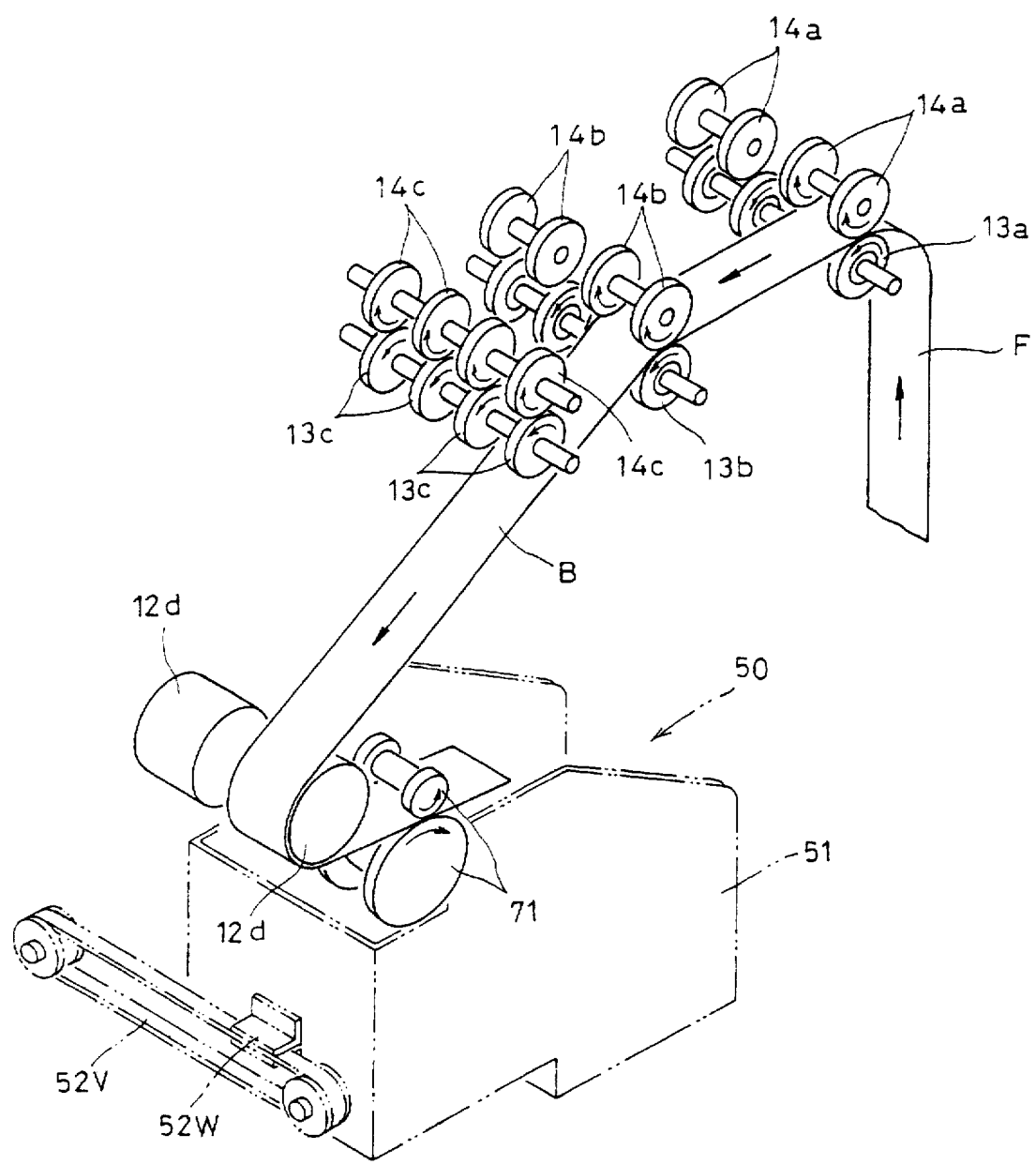
FIG. 13 is a perspective illustrating how a film is fed on lane B.

When the film F on the lane A has been completely reeled into the film magazine 50A, the magazine unit 50 is moved to the lane B as shown in FIG. 13 to reel the film on the lane B into the film magazine 50A. In this state, the film is fed by pressing the pressure roller unit 14 against the film until it is caught between the feed rollers 71 of the take-up means 50B. The film is then reeled into the film magazine 50A in the same manner as with the film on the lane A.

Instead of the movable magazine unit 50, two separate magazine units may be used for the respective lanes A, B so that the films on both lanes can be reeled into the magazine units simultaneously.

Of the two films connected to one leader, the film to be reeled into the film magazine first is fed in the above-described manner. By the time the first film is completely reeled into the film magazine, the rear end of the second film is already in the loop tank. Thus, it is possible to reel in the second film continuously at high speed. (If the second film is so long that its rear end is still in the drying unit when the first film has been completely reeled in, it has to be fed intermittently at a slow pace.) Since the second film can be reeled in quickly, it is possible to shorten the overall film reeling time. Also, there is no need to change the intervals of film insertion.

The films fed on the lanes A and B are reeled into the magazine unit in the following manner.

Films F are inserted through the slot 79 (FIG. 5). When photoelectric sensor PH3 detects their rear ends, the motor 73 is activated to rotate, through the belt 73a, the roller shaft 74, the detector plate 80 fixed to the shaft, and the feed rollers 71. The roller 81 on the detector plate 80 is initially at the position shown in FIG. 5. When the motor 73 is activated, the roller 81 turns counterclockwise, so that it abuts and raises the arm 82. The arm thus pivots about the arm support pin.

Figure 14:
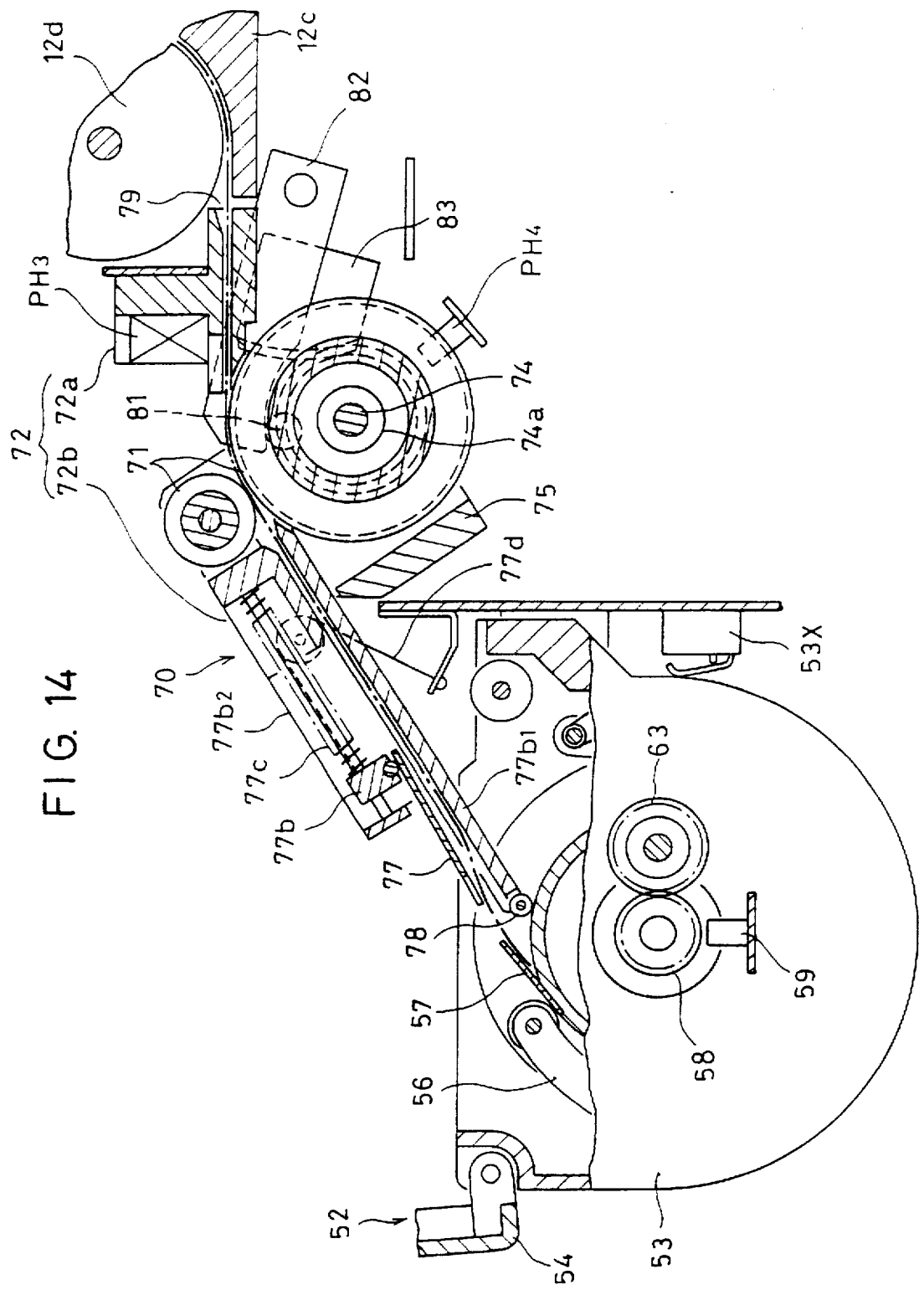
FIGS. 14–16 are views illustrating how film take-up means takes up films.

The gear plate 83 fixed to the arm 82 thus rotates about the arm support pin, and so does the gear 84. As the gear 84 rotates, the guide bracket 75, to which the gear 84 is fixed, pivots (inclines) about the roller shaft 74 and stops at the position shown in FIG. 14 (this position is determined by the pulse rate of the motor 73). In this embodiment, the films are fed so that their leading ends reach about 15 mm short of the leading end of the pivot guide 72b before the latter pivots to its horizontal position, and reach the tip of the pivot guide by the time the guide roller 78 at the tip of the pivot guide touches as the bottom of the magazine reel 55. (The feed rate of films is determined by the diameter and rotation angle of the feed rollers.) Further, before the feed rollers 71 stop rotating, the films F are fed under one of the film presser plates 57 of the film magazine 50A to slacken the films F as shown in FIG. 14.

When the pivot guide 72b inclines, the film presser 77 slides forward and protrudes from the guide box 72b2 of the guide 72b to prevent the film tip from curling.

The film presser 77 is mounted to the block 77b so as to be pivotable slightly about a pin. When the pivot guide 72b inclines, the block 77b, which has been kept stationary by rope 77d, begins to move forwardly by the bias of compression spring 77c, so that the film presser 77 will protrude from the guide box 72b2.

When the pivot guide 72b stops its pivoting motion, the motor 61 is activated to rotate the magazine reel 55 through the belt 62, the driving gear 63, and the gear 58 on the film magazine meshing with the driving gear 63.

When the photoelectric sensor PH1 detects the rear end of the film, the motor 61 is deactivated, stopping the reel. Then, the motor 73 is reactivated to turn the roller 81 back to its original position (shown in FIG. 5), and at the same time, the pivot guide 72b, guide bracket 75, etc. are returned to their original positions by the return spring 85 (for example, the pivot guide 72b returns to its horizontal position by being pushed by the stopper 86).

Figure 15:
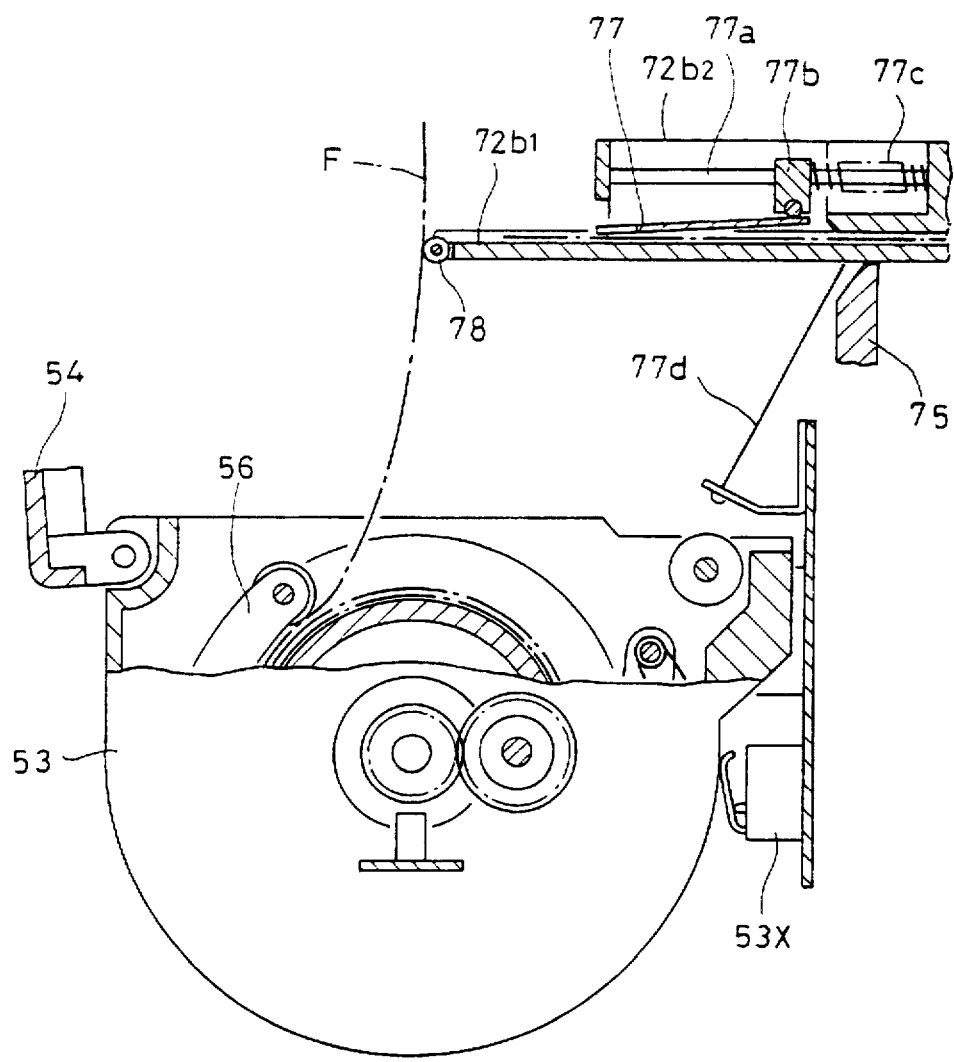
Figure 16:
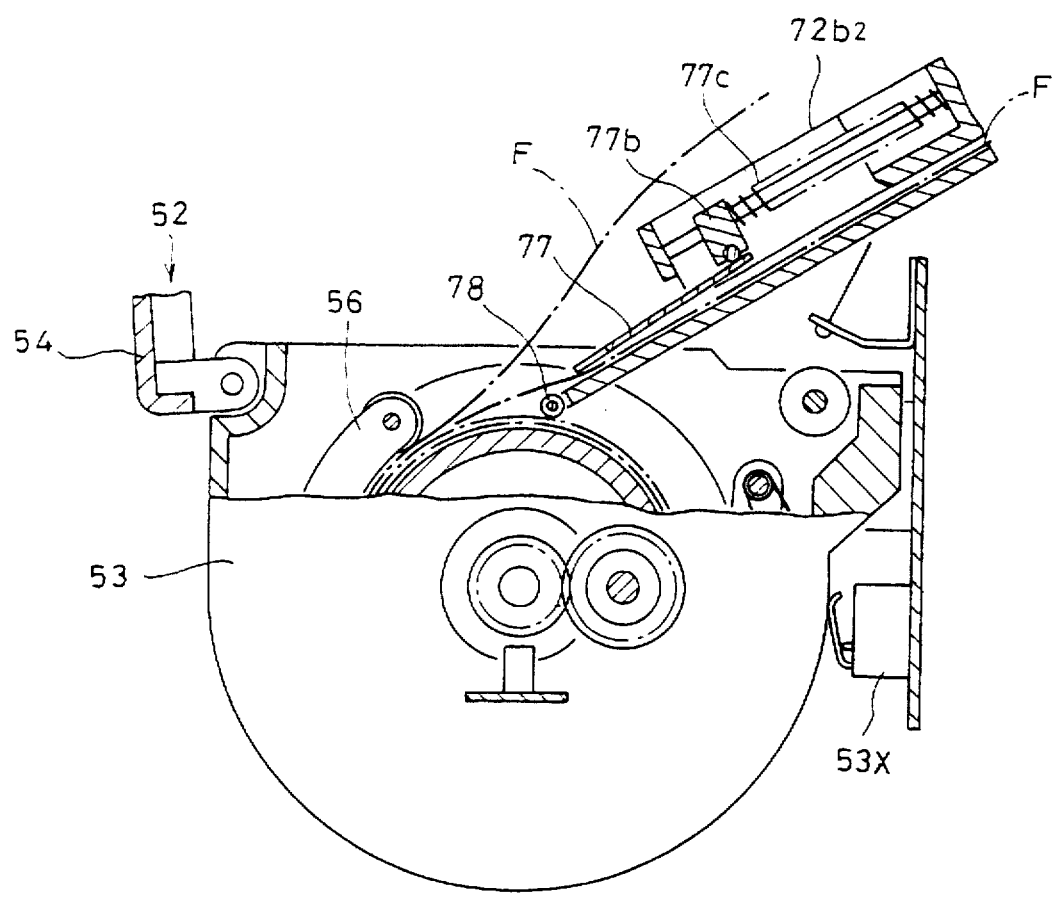

When the pivot guide 72b pivots back to its original position, the film F in the guide 72b comes out as shown in FIG. 15. Then, the abovementioned operation is repeated to insert the next film under the rear end of the first film as shown in FIG. 16. In this state, the motor 61 is reactivated to reel in the second film.

In this way, a plurality of films are reeled in one after another. The level of the guide roller 78 increases with the volume of films reeled into the magazine reel. Namely, as the volume of films in the magazine reel increases, the pivot guide 72b will gradually pivot upward about the support pin 76.

By pressing a switch on an outer case (not shown), the magazine reel 55 and the pivot guide 72b are moved to their initial positions. Namely, by pressing the switch, the reel-driving motor 61 and the film feed motor 73 are activated to move the film presser plate 57 to the position shown in FIG. 6 by detecting a hole in the gear 58 of the film magazine with the reel detector 59, and to turn the detector plate 80 so that its roller 81 comes to a predetermined position by detecting a hole formed in the detector plate 80 with the photoelectric sensor PH4.

When a plurality of films have been reeled into the film magazine 50A (film feeder), the film magazine is detached from the take-up means 50B and set in a film printer near its film insertion slot. Thus, it is possible to feed films smoothly and continuously into the printer.

Figure 17:
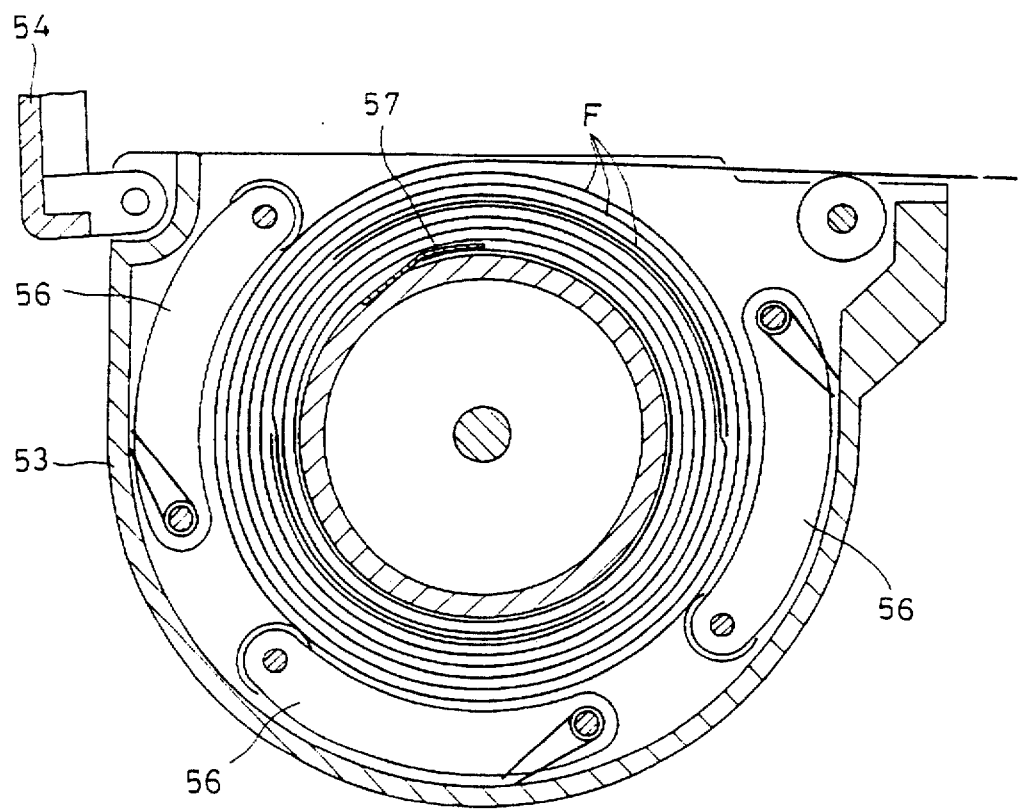
FIG. 17 is a schematic view showing how films are wound in the film magazine.

With a plurality of films reeled into the film magazine 50A, the front end of each film is inserted under the rear end of the preceding film (FIG. 17). Thus, due to this friction between the overlapping portions of the adjacent films, it is possible to unreel films one after another from the film magazine 50A without the need of splicing them together, as required in the prior arrangements.

In the embodiment, before feeding a film into the film magazine 50A, the pivot guide 72b of the guide/feed unit is turned about the support pin until its tip comes close to the film magazine to insert the film under the rear end of the preceding film. But such guide/feed unit may be a different type.

For example, the guide/feed unit may be in the form of a straight, oblique guide having a tip movable toward and away from the film insertion slot of the film magazine 50A and adapted to raise the rear end of the preceding film by rising obliquely when its tip moves away from the film magazine 50A.

In this embodiment, a single movable magazine unit 50 is used. But instead, two sets of take-up means 50B and film magazines A may be provided on the respective lanes, while omitting the slide means for sliding the single magazine unit. With this arrangement, it is possible to activate the pressure roller units on both lanes at the same time and thus to reel films F on both lanes at the same time.

If the winder is to be used with only one film connected to each leader, it is possible to omit all the units corresponding to one of the two lanes.

The film developing machine can develop 135 mm films and films other than 135-mm films simultaneously. For example, the combinations shown in FIGS. 9B and 9C are possible. In the case of FIG. 9B, 135 mm films are reeled, while 110 mm films are dropped into the loop tank. Namely, the leader L is fed to the third feed rollers 13c in the above-described manner and stopped. Then, after cutting the films F from the leader L with the film cutter 31, the pressure roller units on the lane for the 135 mm film are kept pressed against the film, while those on the lane for the other film are removed from the film.

In this state, the loop guide 21 is turned to push down the films. The film that is not pressed by the pressure rollers is thus pulled back toward the loop tank 22, so that its leading end drops into the loop tank 22. When the upper loop sensor LO detects the leading end, the loop guide 21 turns back to its horizontal position. Since its leading end is in the loop tank, the remaining-portion of this film, which continuously feeds into the winder, also drops into and remains in the tank. The film type detecting sensor PH1 detects the type of film.

Figure 18A:
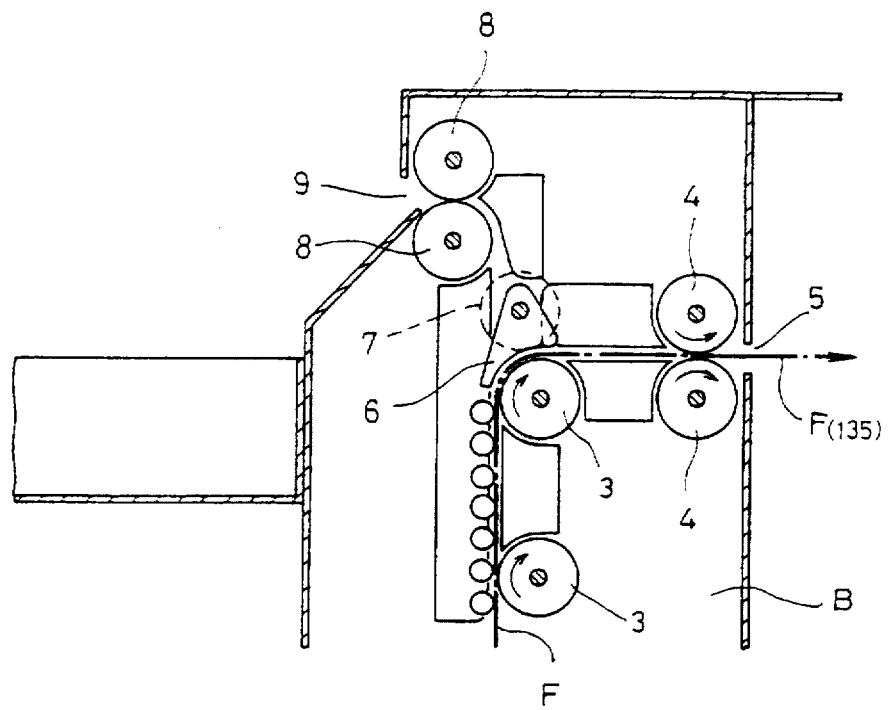
FIGS. 18A and 18B are schematic views of a film type selection unit.
Figure 18B:
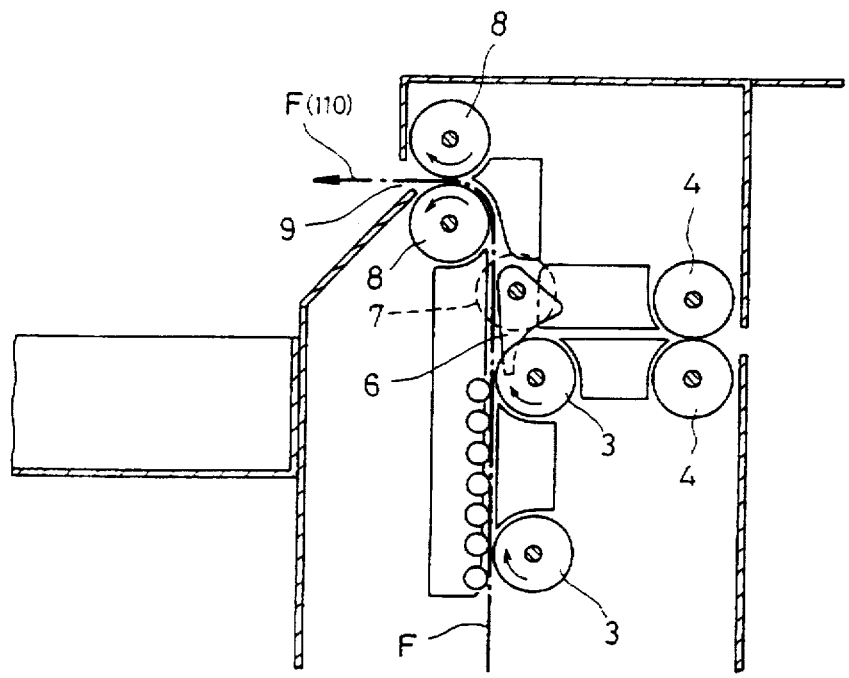

If both films connected to a leader are not 35 mm films, a mechanism shown in FIGS. 18A, 18B is used.

As shown in FIG. 18A, a course changeover means 6 is provided at a point where the film feed path formed in the drying unit B by a row of feed rollers 3 curves toward delivery rollers 4. By turning the changeover means 6 with a solenoid 7, films can be fed straight ahead toward and discharged through delivery rollers 8 and an outlet 9. The changeover means 6 has a recess for turning e.g. 35 mm films by 90°. By moving the changeover means from the position shown in FIG. 18A to the position shown in FIG. 18B with the solenoid 7, 110 mm films can be fed straight ahead.

Finally, in any of the above-described various embodiments, the magazine unit 50 has the take-up means 50B before the film magazine 50A. But if films are to be reeled in one at a time, the take-up means 50B is not necessary. In this case, films discharged from the film guide 12 are directly reeled into the film magazine 50A. Thus, it is necessary to synchronize the reel drive mechanism of the film magazine 50A with the film feed mechanism.

What is claimed is:

1. A film winder for winding films discharged from a film developing machine, said film winder comprising:

a film feed path through which are fed developed films discharged from the film developing machine with leaders attached to leading ends of the films;

a film feed adjusting means provided along said film feed path for adjusting the feed of the films along said film feed path by slackening the films;

a film cutter for cutting the films from the leaders;

a separator for directing the films and leaders into separate paths;

a film magazine having a rotatable film winding reel provided on a surface thereof with a film end engaging means; and a continuous film winding means for continuously winding films around said film winding reel, said film winding means comprising a film guide for sliding a leading end of each film under said film end engaging means to cause the film end to be engaged by said engaging means or a trailing end of a preceding film which has been wound around said reel while raising such trailing end, and a driving means for rotating said reel with the leading end of such each film slid under said film end engaging means or under the trailing end of such preceding film to wind such each film around said reel.

2. A film winder as claimed in claim 1, further comprising means for picking out, from among the films being fed through said film feed path, films that cannot be reeled in due to having incorrect widths, and means for stocking the thus picked-out films.

3. A film winder as claimed in claim 1, wherein said film feed path comprises a predetermined plural number of lanes, said predetermined number being equal to the number of films attached to each leader, said film feed adjusting means, said film cutter, said separator, said magazine and said continuous film winding means each being provided in said predetermined number.

4. A film winder as claimed in claim 3, further comprising means for picking out, from among the films being fed through said film feed path, films that cannot be reeled in due to having incorrect widths, and means for stocking the thus picked-out films.

5. A film winder as claimed in claim 1, wherein said film feed path comprises a predetermined number of lanes, said predetermined number being equal to the number of film or films attached to each leader, said film feed adjusting means, said film cutter and said separator each being provided in said predetermined number.

6. A film winder as claimed in claim 5, further comprising means for picking out, from among the films being fed through said film feed path, films that cannot be reeled in due to having incorrect widths, and means for stocking the thus picked-out films.

* * * * *